United States Patent [19]

Kohyama et al.

[11] Patent Number: 4,642,269

[45] Date of Patent: Feb. 10, 1987

[54] CRYSTALLINE RANDOM PROPYLENE COPOLYMER COMPOSITION AND COMPOSITE LAMINATE COMPRISING SAID COMPOSITION

[75] Inventors: Masaki Kohyama, Ichihara; Takeshi Muranaka, Iwakuni; Kunisuke Fukui, Hiroshima; Norio Kashiwa, Iwakuni, all of Japan

[73] Assignee: Mitsui Petrochemical Industries, Ltd, Tokyo, Japan

[21] Appl. No.: 792,595

[22] Filed: Oct. 29, 1985

[30] Foreign Application Priority Data

Nov. 1, 1984 [JP] Japan ............................ 59-228952
Nov. 1, 1984 [JP] Japan ............................ 59-228953

[51] Int. Cl.$^4$ ................... C08J 5/18; C08L 23/14; C08L 23/16; C08L 23/18
[52] U.S. Cl. .................... 428/516; 428/335; 428/336; 525/240
[58] Field of Search .................. 525/240; 428/516

[56] References Cited

U.S. PATENT DOCUMENTS 4,186,240  1/1980  Matsuda et al. ................ 525/240
4,230,767 10/1980  Isaka et al. .................... 428/516

FOREIGN PATENT DOCUMENTS 0135358  3/1985  European .............. Pat. Off.
1582186  3/1980  United Kingdom.
2055688  3/1981  United Kingdom.

*Primary Examiner*—Carman J. Seccuro
*Attorney, Agent, or Firm*—Sherman & Shalloway

[57] ABSTRACT

A crystalline random propylene copolymer composition comprising (i) a crystalline random propylene copolymer comprising 99 to 85 mole % of propylene and 1 to 15 mole % of an alpha-olefin other than propylene and (ii) a random 1-butene copolymer comprising 1-butene and an alpha-olefin having at least 5 carbon atoms, the weight ratio of the copolymer (i) to the copolymer (ii) being in the range of from 5:95 to 90:10, said random 1-butene copolymer (ii) satisfying the following conditions:

(A) it comprises 50 to 99 mole % of the 1-butene component and 1 to 50 mole % of the alpha-olefin,
(B) it has an intrinsic viscosity $[\eta]$, measured in decalin at 135° C., of from 0.5 to 6 dl/g,
(C) it has a melting point [Tm], measured by a differential scanning calorimeter, of from 30° to 120° C.,
(D) it has a crystallinity, measured by X-ray diffractometry, of from 5 to 60%,
(E) the amount [$W_1$ in % by weight] of that portion of it which is soluble in boiling methyl acetate is not more than 2%, and
(F) the amount [$W_2$ in % by weight] of that portion of it which is soluble in a 1:1 by volume mixture of acetone and n-decane at 10° C. is less than $5 \times [\eta]^{-1.2}$.

22 Claims, No Drawings

CRYSTALLINE RANDOM PROPYLENE COPOLYMER COMPOSITION AND COMPOSITE LAMINATE COMPRISING SAID COMPOSITION

BACKGROUND OF THE INVENTION

1. Field of the Invention

This invention relates to a crystalline random propylene copolymer composition which can give a polypropylene composite laminate having improved heat sealing property by laminating it to the surface of a crystalline polypropylene substrate, and to a laminated composite so obtained.

2. Description of the Prior Art

Crystalline polypropylene films have found extensive use in the field of packaging, especially food packaging, because of their superiority in mechanical properties such as tensile strength, rigidity, surface hardness and impact strength, optical properties such as gloss and transparency, and food hygiene such as the freedom from toxicity and odor. They, however, have the defect that temperatures at which a single layer of polypropylene film can be heat-sealed are high and a proper range of these temperatures is narrow.

In an attempt to improve the heat sealing property of polypropylene films, some methods have already been proposed in which a low-melting resin is laminated to one or both surfaces of a crystalline polypropylene film.

For example, Japanese Laid-Open Patent Publication No. 65552/1980 discloses a process in which a propylene random copolymer composition composed of a random ethylene/propylene copolymer comprising propylene as a main component and a random propylene/alpha-olefin copolymer comprising propylene as a main component is laminated to a crystalline polypropylene film.

Japanese Laid-Open Patent Publication No. 91665/1980 discloses a process in which a random propylene copolymer composed of an ethylene/propylene random copolymer comprising propylene as a main component and a random 1butene/ethylene copolymr comprising 1-butene as a main component is laminated to a crystalline polypropylene film.

Japanese Laid-Open Patent Publication No. 106585/1979 discloses a process in which a random propylene copolymer composition composed of a random ethylene/propylene copolymer comprising propylene as a main component, a copolymer of 1-butene and an ethylenically unsaturated monomer comprising 1-butene as a main component and a low-molecular-weight thermoplastic resin is laminated to a crystalline polypropylene film.

U.S. Pat. No. 4,230,767 claiming Convention priority from the above-cited Japanese Laid-Open Patent Publications Nos. 91665/1980 (Japanese Patent Application No. 165137/1978) and 106585/1979 (Japanese Patent Application No. 13932/1978) discloses a random propylene copolymer composition which can embrace a composition composed of a random ethylene/propylene copolymer comprising propylene as a main component and a 1/butene-propylene copolymer containing 1-butene as a main component and includes an embodiment in which such a propylene random copolymer is laminated to a crystalline polypropylene film.

SUMMARY OF THE INVENTION

The present inventors have found that a polypropylene composite laminate obtained by laminating a random crystalline copolymer composition composed of a crystalline random propylene copolymer comprising propylene as a main component and a 1-butene type random copolymer comprising 1-butene as a main component and a minor proportion of a low-molecular-weight polymer component and having specific characteristics to at least one surface of a crystalline propylene substrate layer can be heat-sealed at relatively low temperatures of a broad range and has excellent heat seal strength, and that the degree of increase of temperatures at which the polypropylene composite laminate can be heat-sealed by low-temperature heat-treatment for obtaining antistatic property is small.

It is an object of this invention therefore to provide a crystalline propylene random copolymer composition which when laminated to at least one surface of a crystalline polypropylene substrate layer, can give a polypropylene composite laminate having excellent low-temperature heat-sealability and heat seal strength, and a composite laminates so obtained.

According to the invention, there is provided a crystalline random propylene copolymer composition comprising (i) a crystalline random propylene copolymer comprising 99 to 85 mole % of propylene and 1 to 15 mole % of an alpha-olefin other than propylene and (ii) a random 1-butene copolymer comprising 1-butene and an alpha-olefin having at least 5 carbon atoms, the weight ratio of the copolymer (i) to the copolymer (ii) being in the range of from 5:95 to 90:10, said random 1-butene copolymer satisfying the following conditions:

(A) it comprises 50 to 99 mle% of the 1-butene component and 1 to 50 mole % of the alpha-olefin, (B) it has an intrinsic viscosity [$\eta$], measured in decalin at 135° C., of from 0.5 to 6 dl/g, (C) it has a melting point [Tm], measured by a differential scanning calorimeter, of from 30° to 120° C., (D) it has a crystallinity, measured by X-ray diffractometry, of from 5 to 60%, (E) the amount [$W_1$ in % by weight] of that portion of it which is soluble in boiling methyl acetate is not more than 2%, and (F) the amount [$W_2$ in % by weight] of that portion of it which is soluble in a 1:1 by volume mixture of acetone and n-decane at 10° C. is less than $5 \times [\eta]^{-1.2}$.

According to this invention, there is also provided a polypropylene composite laminate obtained by laminating a layer of the above crystalline random propylene copolymer to at least one surface of a substrate layer of crystalline polypropylene.

DETAILED DESCRIPTION OF THE INVENTION

The crystalline random propylene copolymer (i) constituting the crystalline random propylene copolymer composition of this invention is a crystalline random copolymer composed of propylene as a main component and an alpha-olefin other than propylene. The content of propylene in the crystalline random propylene copolymer is usually 99 to 85 mole %, preferably 98 to 90 mole %. The contents of propylene and the other alpha-olefins are measured, for example, by $^{13}$C-NMR. The content of the alpha-olefin other than propylene is usually 1 to 15 mole %, preferably 2 to 10 mole %. The alpha-olefin other than propylene is preferably ethylene and alpha-olefins having 4 to 20 carbon atoms, especially 1-butene, 1-pentene, 1-hexene and 4-methyl- 1-pentene. It may be a mixture of at least two of these alpha-olefins.

The crystalline random propylene copolymer (i) has an intrinsic viscosity [η], measured in decalin at 135° C., of usually 1.5 to 4, preferably 1.7 to 3.5, dl/g, a melting point [Tm], measured by a differential scanning calorimeter, of usually 120° to 155° C., preferably 120° to 145° C., and a crystallinity, measured by X-ray diffractometry, of usually 35 to 50%, preferably 35 to 50%.

The 1-butene random copolymer (ii) as the other component of the crystalline random copolymer composition of this invention is a 1-butene random copolymer containing 1-butene as a main component and an alpha-olefin having at least 5, preferably 5 to 20 carbon atoms.

The random 1-butene copolymer has a 1-butene content of 50 to 99 mole %, preferably 60 to 98 mole %, and an alpha-olefin content of 1 to 50 mole %, preferably 2 to 40 mole %. The contents of 1-butene and the other alpha-olefins can be measured by $^{13}$C-NMR. As required, the 1-butene random copolymer may contain a small amount of another alpha-olefin such as propylene. If the 1-butene random copolymer contains less than 50 mole % of the 1-butene, a polypropylene composite laminate obtained by laminating the crystalline random propylene copolymer undergoes blocking or has reduced scratch resistance. Furthermore, temperatures at which it can be heat-sealed rise greatly. Furthermore, if the 1-butene component content is higher than 99 mole %, the heat-sealing temperature for the polypropylene composite laminate becomes high, and its heat seal strength is reduced.

Examples of the alpha-olefin component having 5 to 20 carbon atoms include 1-pentene, 1-hexene, 4-methyl-1-pentene, 3-methyl-1-pentene, 1-octene, 1-decene, 1-dodecene, 1-tetradecene, 1-hexadecene, 1-octadene and 1-eicocene.

The intrinsic viscosity [η] of the random 1-butene copolymer measured in decalin at 135° C. is 0.5 to 6 gl/g, preferably 1 to 5 dl/g. If the intrinsic viscosity of the 1-butene copolymer is larger than 6 dl/g, it is difficult to reduce the thickness of the heat sealing layer of the polypropylene composite laminate obtained by laminating the crystalline random propylene copolymer composition. If it is less than 0.5 dl/g, the heat seal strength of the composite laminate is reduced, and temperatures at which it can be heat-sealed by heat-treatment rise greatly.

The melting point [Tm] of the 1-butene random copolymer measured by a differential scanning calorimeter is 30° to 120° C., preferably 40° to 115° C. If the melting point of the 1-butene copolymer is higher than 120° C., the heat sealing temperature of a polypropylene composite laminate obtained by laminating the crystalline propylene random copolymer composition becomes high, and its heat seal strength is reduced. If it is lower than 30° C., the polypropylene composite laminate undergoes blocking and has reduced scratch resistance. Furthermore, temperatures at which it can be heat-sealed by heat-treatment rise greatly.

The melting point by a differential scanning calorimeter (DSC melting point) is measured as follows: A 0.1 mm-thick press sheet taken 20 hours after its molding is subjected to differential scanning calorimetry at a temperature raising rate of 10° C./min. over a range of 0 to 200° C., and the maximum endothermic peak is determined and defined as Tm.

The crystallinity (D) of the 1-butene random copolymer measured by X-ray diffractometry is in the range of 5 to 60%, preferably 10 to 50%. If the crystallinity of the 1-butene random copolymer is higher than 60%, the heat sealing temperature for a polypropylene composite laminate obtained by laminating the crystalline random propylene copolymer composition becomes high, and its heat seal strength is reduced. If it is less than 5%, the polypropylene composite laminate undergoes blocking and has reduced scratch resistance. Furthermore, temperatures at which it can be heat-sealed by heat-treatment rise greatly. The crystallinity is determined by X-ray diffractometry using a 1.5 mm thick press sheet taken 20 hours after its molding.

The amount [$W_1$ in % by weight] (E) of that portion of the 1-butene random copolymer soluble in boiling methyl acetate is not more than 2% by weight, for example 0.01 to 2% by weight, preferably 0.02 to 1% by weight, especially peferably 0.03 to 0.5% by weight. The amount [$W_1$] is preferably within the range represented by the following formulae.

$$0.01 \leq W_1 \leq 0.02a + 1.0$$

more preferably $0.02 \leq W_1 \leq 0.015a + 0.7$ especially preferably $0.03 \leq W_1 \leq 0.01a + 0.5$ In the above formulae, a represents the content in mole % of the alpha-olefin component in the 1-butene copolymer.

If the [$W_1$] is larger than 2% by weight, a polypropylene composite laminate obtained by laminating the crystalline propylene random copolymer undergoes blocking and has reduced scratch resistance. Furthermore, temperatures at which it can be heat-sealed by heat-treatment rise greatly. The [$W_1$] is measured by the following method.

A polymer sample, having a size of about 1 mm×1 mm×1 mm is put in a cylindrical glass filter, and extracted for 7 hours by a Soxhlet extractor at a reflux frequency of about 1 per 5 minutes. The extraction residue is dried in a vacuum dryer (degree of vacuum less than 10 mmHg) and its weight is measured. The weight of that portion which dissolves in boiling methyl acetate is determined from a weight difference from the original sample. [$W_1$] is the percentage of the weight of the boiling methyl acetate-soluble portion based on the weight of the original sample.

The amount [$W_2$ in % by weight] (F) of that portion of the 1-butene type copolymer which dissolves at 10° C. in a mixture of acetone and n-decane is less than $5 \times [\eta]^{-1.2}$% by weight, for example $0.1 \times [\eta]^{-1.2}$ to $5 \times [\eta]^{-1.2}$% by weight, preferably $0.2 \times [\eta]^{-1.2}$ to $4 \times [\eta]^{-1.2}$% by weight, espcially preferably $0.3 \times [\eta]^{-1.2}$ to $4 \times [\eta]^{-1.2}$%, by weight, based on the weight of the copolymer. [η]] used herein means the intrinsic viscosity value of the copolymer. If [$W_2$] is larger than $5 \times [\eta]^{-1.2}$, a polypropylene composite laminate obtained by laminating the crystalline random propylene copolymer composition undergoes blocking and has reduced scratch resistance. Furthermore, temperatures at which it can be heat-sealed by heat-treatment increase. The [$W_2$] value is determined as follows:

One gram of a copolymer sample, 0.05 g of 2,6-ditertbutyl-4-methylphenol and 50 ml of n-decane are put in a 150 ml flask equipped with stirring vanes and dissolved on an oil bath at 120° C. After the dissolving, the solution is allowed to cool spontaneously at room temperature for 30 minutes. Then, 50 ml of acetone is added over 30 seconds, and the solution is cooled on a water bath at 10° C. for 60 minutes. The precipitated copolymer is separated from the solution containing a low-molecular-weight polymer component by filtration through a glass filter. The solution is dried at 150° C. and 10 mmHg until its weight becomes constant. The weight of the dried product is measured. The amount of the copolymer which dissolves in the mixed solvent is calculated as the percentage of the weight of the original sample copolymer. In the above method, the stirring is continuously effected from the time of dissolution until immediately before the filtration.

The 1-butene random copolymer satisfies a combination of parameters represented by the characteristic values (A) to (F), and preferably also satisfies the following parameters (G) to (L).

The stress at yield point (G) of the 1-butene random copolymer, measured by the method of JIS K-7113, is 10 to 200 kg/cm$^2$, preferably 20 to 150 kg/cm$^2$. The stress at break point (H), of the 1-butene random copolymer, measured by the method of JIS K-7113, is 10 to 1000 kg/cm$^2$, preferably 120 to 600 kg/cm$^2$. The elongation at break point (T) of the 1-butene random copolymer, measured by the method of JIS K-7113, is at least 300%, preferably 500 to 1500%. The stress at yield point (G), the stress at break point (H) and the elongation at break point (I) are measured by the testing method of JIS K-7113. Specifically, a 1 mm-thick press sheet is molded by the method of JIS K-6758, and 19 hours after the molding, a test sample (No. 2 in accordance with JIS K-7113) is punched out from the press sheet. The above properties of the test sample were measured at a stretching speed of 50 mm/min. in an atmosphere kept at 25° C. 20 hours after the molding of the press sheet. When no clear yield point appears, a stress at 20% stretch is taken as the stress at yield point.

The torsional rigidity (J) of the 1-butene random copolymer, measured by the mehod of JIS K-6745, is, for example, 100 to 2000 kg/cm$^2$, preferably 150 to 1500 kg/cm$^2$. The torsional rigidity is measured as follows: A 1 mm-thick press sheet is molded in accordance with JIS K6758, and 9 days after the molding, a rectangular test sample, 64 mm long and 635 mm wide, is punched out from the press sheet. Ten days after the molding of the press sheet, a load is applied to the test sample in an atmosphere kept at 25° C. at a torsional angle of 50 to 60 degrees, and 5 seconds later, the rigidity of the sample is measured.

The Young's modulus (K) of the 1-butene random copolymer, measured in accordance withg the method of JIS K-7113, is 200 to 4000 kg/cm$^2$, preferably 300 to 3000 kg/cm$^2$. Preferably, the Young's modulus (K) of the 1-butene random copolymer is expressed by the following formula in relation to the alpha-olefin content (b mole %) of the copolymer.

$$3000 - 30b \geq K \geq 1000 - 15b$$

The Young's modulus is measured by the same tensile test as in testing (G), (H) and (I).

The standard deviation $\sigma$ (L) of the 1-butene content of the 1-butene random copolymer is usually not more than 0.4a mole %, preferably not more than 0.3a mole % (a represents the ethylene conent in mole % of the 1-butene random copolymer). The standard deviation $\sigma$ is a measure of the randomness of the 1-butene random copolymer. A copolymer of this invention which satisfies the characteristic value (L) as well as the characteristic values (A) to (K) shows better properties.

The standard deviation value $\sigma$ of the 1-butene random copolymer of this invention is determined by the following equation based on the composition distribution of the copolymer. The composition distribution of the copolymer is measured by an extraction-type column fractionation method in which p-xylene is used as a solvent and the extraction temperature is changed stepwise from 0° to 130° C. at 5° C. intervals. Extraction at a given temperature is carried out for 4 hours by using 2 liters of p-xylene per 10 g of the copolymer sample.

$$\sigma = \left( \int_0^{100} (\bar{x} - x)^2 f(x) dx \right)^{\frac{1}{2}}$$

wherein $\bar{x}$ represents the average content in mole % of 1-butene in the copolymer, x represents the 1-butene content (mole %), and f(x) represents the differential weight fraction of a component having the 1-butene content x (mole %).

The 1-butene random copolymer (ii) can be prepared, for example, by copolymerizing 1-butene and alphaolefin at a temperature of about 20° to about 200° C. in the presence of a catalyst and a molecular weight controlling agent such as hydrogen, the catalyst being formed from (a) a highly active titanium catalyst component containing magnesium, titanium, halogen and a diester component as essential ingredients and prepared by reacting a magnesium compound, a titanium compound and a diester and optionally a halogen compound (not always necessary when the magnesium or titanium compound contains a halogen atom), (b) an organoaluminum compound, and (c) an organic silicon compound catalyst component having an Si-O-C bond.

In the production of the 1-butene random copolymer, the catalyst and the polymerization conditions may be selected by preliminary experiments so that it satisfies the characteristics (A) to (F).

The titanium catalyst component (a) is prepared preferably by contacting a magnesium compound (or magnesium metal), a titanium compound and a diester or a diester-forming compound with or without other reagents. The preparation can be effected in the same way as in the preparation of known highly active titanium catalyst components containing magnesium, titanium, halogen and an electron donor as essential ingredients. For example, it can be produced in accordance with the methods disclosed in British Patent Specifications Nos. 1492618, 1554340 and 1554248, U.S. Pat. Nos. 4157435, 4076924, 4085276, 4250285, 4232139, 4143223, 4315874, 4330649, 4401589 and 4335015, and European Patent Specification No 22675.

Several embodiments of producing the titanium catalyst component (a) will be illustrated below.

(1) A magnesium compound or a complex of a magnesium compound and an electron donor is pre-treated or not-pretreated with an electron donor and/or a reaction aid such as an organoaluminum compound or a halogen-containing silicon compound in the presence or absence of an electron donor or a pulverization aid with or without pulverization. The resulting solid is reacted with a titanium compound which is in the liquid state under the reaction conditions. In the above procedure, the electron donor is used at least once as the electron donor.

(2) A magnesium compound in the liquid state having no reducing ability is reacted with a titanium compound in the liquid state in the presence of an electron donor to precipitate a solid titanium complex.

(3) The product obtained in (2) above is further reacted with a titanium compound.

(4) The product obtained in (1) or (1) is further reacted with a titanium compound and an electron donor.

(5) A magnesium compound or a complex of a magnesium compound and an electron donor is pulverized in the presence of a titanium compound and in the presence or absence of an electron donor and a pulverization aid, and with or without pre-treatment with an electron donor and/or a reaction aid such as an organoaluminum compound or a halogen-containing silicon compound, treated with a halogen, a halogen compound or an aromatic hydrocarbon. In the above procedure, the electron donor is used at least once.

Preferred among these methods are those in which a liquid titanium halide is used, or a halogenated hydrocarbon is used after or during the use of the titanium compound.

The electron donor used in the above methods of preparation is not necessarily limited to the diester or diester-forming compound. There may be used other electron donors such as alcohols, phenols, aldehydes, ketones, ethers, carboxylic acids, carboxylic acid anhydrides, carbonic acid esters, monoesters and amines.

Preferred examples of the diester as an essential component of the highly active solid titanium catalyst component (a) used in the invention include diesters of dicarboxylic acids in which two carboxyl groups are attached to one carbon atom and dicarboxylic acids in which one carboxyl group is attached to each of the two adjoining carbon atoms. Examples of the dicarboxylic acids in such dicarboxylic acid esters are malonic acid, substituted malonic acid, succinic acid, substituted succinic acid, maleic acid, substituted maleic acid, fumaric acid, substituted fumaric acid, alicyclic dicarboxylic acids in which two carboxyl groups are attached to one carbon atom forming the aliphatic ring, alicyclic dicarboxylic acids in which one carboxyl group is bonded to each of the two adjoining carbon atoms forming the aliphatic ring, aromatic dicarboxylic acids having carboxyl groups at the ortho-position, and heterocyclic dicarboxylic acids having one carboxyl group to each of the two adjoining carbon atoms forming the heterocyclic ring.

Specific examples of the dicarboxylic acids exemplified above include malonic acid; substituted malonic acids such as methylmalonic acid, ethylmalonic acid, isopropylmalonic acid, allylmalonic acid, and phenylmalonic acid; succinic acid; substituted succinic acids such as methylsuccinic acid, dimethylsuccinic acid, ethylsuccinic acid, methylethylsuccinic acid and itaconic acid; maleic acid; substituted maleic acids such as citraconic acid and dimethylmaleic acid; alicyclic dicarboxylic acids such as cyclopentane-1,1-dicarboxylic acid, cyclopentane-1,2-dicarboxylic acid, cyclohexane-1,2-dicarboxylic acid, cyclohexene-1,2-dicarboxylic acid, cyclohexene-2,3-dicarboxylic acid, cyclohexene-3,4-dicarboxylic acid, cyclo-hexene-4,5-dicarboxylic acid, Nadic Acid, Methylnadic Acid, and 1-allylcyclohexane-3,4-dicarboxylic acid; aromatic dicarboxylic acids such as phthalic acid, naphthalene-1,2-dicarboxylic acid and naphthalene-2,3-dicarboxylic acid; and heterocyclic dicarboxylic acids such as furane-3,4-dicarboxylic acid, 4,5-dihydrofurane-2,3-dicarboxylic acid, benzopyran-3,4-dicarboxylic acid, pyrrole-2,3-dicarboxylic acid, pyridine-2,3-dicarboxylic acid, thiophene-3,4-dicarboxylic acid, and indole-2,3-dicarboxylic acid.

Preferably, at least one of the alcohol components of the dicarboxylic acid diesters exemplified above has at least 2 carbon atoms, especially at least 3 carbon atoms. It is above all preferred that both of the alcohol components have at least 2 carbon atoms, especially at least 3 carbon atoms. Examples include the diethyl esters, diisopropyl esters, di-n-propyl esters, di-n-butyl esters, diisobutyl esters, di-tert-butyl esters, diisoamyl esters, din-hexyl esters, di-2-ethylhexyl esters, di-n-octyl esters, diisodecyl esters, and ethyl n-butyl esters of the above-exemplified dicarboxylic acids.

Both a magnesium compound having reducing ability and a magnesium compound having no reducing ability can be utilized in the preparation of the solid highly active titanium catalyst component (a).

The former includes, for example, magnesium compounds having a magnesium-carbon bond or a magnesium-hydrogen bond, for example dimethyl magnesium, diethyl magnesium, dipropyl magnesium, dibutyl magnesium, ethylbutyl magnesium, diamyl magnesium, dihexyl magnesium, didecyl magnesium, ethylmagnesium chloride, propylmagnesium chloride, butylmagnesium chloride, hexylmagnesium chloride, amylmagnesium chloride; ethyl butylmagnesium and butylmagnesium hydride. These magnesium compounds may be used in the form of a complex with an organoaluminum compound, for example, or may be in the form of a liquid or a solid.

The latter includes, for example, magnesium halides such as mangnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxy magnesium chloride and methylphenoxymagnesium chloride; alkoxymagnesiums such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds having no reducing ability may be derived from the aforesaid magnesium compounds having reducing ability, or those derived during the preparation of the catalyst component. The above magnesium compounds may be a complex with other metals or mixtures of other metal compounds. Or they may be a mixture of two or more of these compounds.

Preferred are the magnesium compounds having no reducing ability, and halogen-containing magnesium compounds, particularly, magnesium chloride, alkoxy magnesium chlorides and aryloxymagnesium chlorides are preferred.

Suitable titanium compounds used to prepare the titanium catalyst component (a) are tetravalent titanium compounds represented by $Ti(OR)_g X_{4-g}$ in which R is a hydrocarbon group, X is halogen and g is 0 to 4.

Specific examples of such titanium compounds include titanium tetrahalides such as $TiCl_4$, $TiBr_4$ and TiI$_4$; alkoxytitanium trihalides such as Ti(OCH$_3$)Cl$_3$, Ti(OC$_2$H$_5$)Cl$_3$, Ti(O n-C$_4$H$_9$)Cl$_3$, Ti(OC$_2$H$_5$)Br$_3$ and Ti(O iso-C$_4$H$_9$)Br$_3$; alkoxytitanium dihalides such as Ti(OCH$_3$)$_2$Cl$_2$, Ti(OC$_2$H$_5$)$_2$Cl$_2$, Ti(O n-C$_4$H$_9$)$_2$Cl$_2$ and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(O n-C$_4$H$_9$)$_3$Cl and Ti(OC$_2$H$_5$)$_3$Br; and tetraalkoxytitaniums such as Ti(OCH$_3$)$_4$, Ti(OC$_2$H$_5$)$_3$ and Ti(O n-C$_4$H$_9$)$_4$. Among them, the halogen-containing titanium compounds, particularly titanium tetrahalides, especially preferably titanium tetrachloride, are preferred. These titanium compounds may be used singly or as a mixture. Or they may be used as diluted in hydrocarbons or halogenated hydrocarbons.

In the preparation of the titanium catalyst component (a), the amounts of the titanium compound, the magnesium compound the electron donor to be supported, and the other electron donors such as alcohols, phenols, monocarboxylic acid esters, the silicon compound and the aluminum compound which may used as required differ depending upon the method of preparation and cannot be defined in a general manner. For example, about 0.1 to about 10 moles of the electron donor to be supported and about 0.05 mole to about 1000 moles of the titanium compound may be used per mole of the magnesium compound.

In the present invention, a catalyst composed of the solid highly active titanium catalyst component (a) described above, (b) an organoaluminum compound and (c) an organic silicon compound having an Si—O—C bond is used.

Examples of the organoaluminum compound (a) include (1) organoaluminum compounds at least having an Al-carbon bond in the molecule, for example organoaluminum compounds represented by the general formula $R^1_m Al(OR^2)_n H_p X_q$ wherein each of $R^1$ and $R^2$, which may be identical or different, represents a hydrocarbon, for example a C$_1$-C$_{15}$ hydrocarbon group, preferably C$_1$-C$_4$ hydrocarbon group, X represents a halogen atom such as $0 \leq m \leq 3$, $0 \leq n \leq 3$, $0 \leq p \leq 3$, $0 \leq q \leq 3$, provided that $m+n+p+q=3$, and (2) complex alkylated products of aluminum and a metal of Group I of the periodic table represented by the following general formula $M^1 Al R^1_4$ wherein $M^1$ is Li, Na or K, and $R^1$ is as defined above. Examples of the organoaluminum compounds (a) are those of the general formulae $R^1_m Al(OR^2)_{3-m}$ wherein $R^1$, $R^2$ and X are as defined above, and m is preferably a number represented by $0<m<3$.

$R^1_m AlH_{3-m}$ wherein R$_1$ is as defined above, and m is preferably a number represented by $2<m<3$, $R^1_m Al(OR^2)_n X_q$ wherein $R^1$, $R^2$ and X are as defined above, $0<m \leq 3$, $0 \leq n \leq 3$, $0 \leq q <3$, $m+n+q=3$.

Examples of the organoaluminum compounds (a) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; partially alkoxylated alkyl aluminums such as alkyl aluminum sesquialkoxides (e.g., ethyl aluminum sesquiethoxide and butylaluminum sesquibutoxide) and partially alkoxylated alkyl aluminums having the average composition represented by $R^1_{2.5}Al(OR^2)_{0.5}$; dialkyl aluminum halides such as diethyl aluminum chloride; dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; other partially halogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, ethyl aluminum butoxy chloride and ethyl aluminum ethoxy bromide.

LiAl (C$_2$H$_5$)$_4$ and LiAl(C$_7$H$_{15}$)$_4$ may be cited as examples of the compounds (b).

There may also be used organic aluminum compounds in which two or more aluminum atoms are bonded through an oxygen or nitrogen atom, which are similar to the compounds (1). Examples are (C$_2$H$_5$)$_2$AlOAl(C$_2$H$_5$)$_2$, (C$_4$H$_9$)$_2$AlOAl(C$_4$H$_9$)$_2$, and

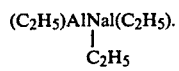

Of these, the trialkyl aluminums and the alkyl aluminums in which two or more aluminum atoms are bonded are preferred.

Illustrative of the organic silicon compound (c) having an Si—O—C are alkoxysilanes and aryloxysilanes. For example, there may be cited organic silicon compounds represented by the following general formula $R_n Si(OR^1)_{4-n}$ wherein R represents a hydrocarbon group, such as an alkyl, cycloalkyl, aryl, alkenyl, haloalkyl, or aminoalkyl group, or halogen, $R^1$ represents a hydrocarbon group such as an alkyl, cycloalkyl, aryl, alkenyl or alkoxyalkyl group, and n is a number represented by $0 \leq n \leq 3$, and n R groups, or $(4-n)OR^1$ groups may be identical or different.

Other examples of the catalyst component (c) include siloxanes having the group OR$^1$ and silyl esters of carboxylic acid. Compounds in which two or more silicon atoms are bonded to each other through an oxygen or nitrogen atom may be cited as still another example. There may also be used the product of reaction of a compound having no Si—O—C bond with a compound having an O—C bond obtained either in advance or in situ. There can be cited the combined use of a halogen-containing silane compound containing no Si—O—C bond or silicon hydride with an alkoxy group-containing aluminum compound, an alkoxy group-containing magnesium compound, a metal alcoholate, an alcohol, a formic acid ester, ethylene oxide, etc. The organic silicon compounds may also include other metals such as aluminum or tin.

Specific examples of preferred organic silicon compounds as component (c) include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, methyltrimethoxysilane, vinyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris(beta-methoxyethoxy)silane, vinyltriacetoxysilane, dimethyltetraethoxydisiloxane and phenyldiethoxydiethylaminosilane. Of these, methyltrimethoxysilane, phenyltrimethoxysilane, methyltriethoxysilane, ethyltriethoxysilane, vinyltriethoxysilane, phenyltriethoxysilane, vinyltributoxysilane, ethyl silicate, diphenyldimethoxysilane, diphenyldiethoxysilane and methylphenylmethoxysilane (the compounds of formula $R_n(OR^1)_4$—n given above in which n is preferably 0 (or 1)) are especially preferred.

The weight ratio of the crystalline random propylene copolymer (i) to the 1-butene random copolymer (ii) in the crystalline random propylene copolymer composition of this invention is from 5:95 to 90:10, preferably from 10:90 to 85:15.

The crystalline random propylene copolymer composition of this invention is composed of the crystalline random propylene copolymer (i) and the 1-butene random copolymer (ii), or it may contain another polymer in addition to the two polymers (i) and (ii). The copolymer composition of this invention may further include ordinary additives such as a heat stabilizer, a weather stabilizer, a nucleating agent, a lubricant, a slip agent, an antistatic agent, an antiblocking agent, an antihaze agent, a pigment and a dye. The suitable proportions of these additives are those which do not impair the low-temperature heat-sealability and heat seal strength of a polypropylene composite laminate prepared by using the composition of this invention.

The copolymer composition of this invention may be prepared by uniformly mixing the aforesaid components by a tumbler, a V-type blender, a Henschel mixer, etc. If desired, the resulting mixture may further be kneaded by an extruder, a Banbury mixer, a kneader, a roll, etc.

A polypropylene composite laminate is prepared by laminating the crystalline random propylene copolymer composition of this invention to one or both surfaces of a substrate composed of crystalline polypropylene. The crystalline polypropylene as the substrate is, for example, crystalline propylene homopolymer, or a crystalline random propylene/alpha-olefin copolymer comprising propylene as a main component such as a propylene/ethylene random copolymer having an ethylene content of 0.1 to 5 mole %, a propylene/ethylene/1-butene random copolymer having an ethylene content of 0.1 to 4 mole % and a 1-butene content of 0.1 to 5 mole %, or a propylene/1-butene random copolymer having a 1-butene content of 0.1 to 5 mole %. The crystalline polypropylene has an intrinsic viscosity $[\eta]$, measured in decalin at 135° C., of usually 1.5 to 4 dl/g, preferably 1.7 to 3.5 dl/g, and a crystallinity, measured by X-ray diffractometry, of usually 50 to 70%, preferably 55 to 70%. The substrate layer composed of the crystalline polypropylene may be non-stretched or in the monoaxially or biaxially stretched state.

The following methods may be cited by way of exemplification for the production of the polypropylene composite laminate.

(1) A method which comprises co-extruding a substrate composed of crystalline polypropylene and the crystalline random propylene copolymer composition, and as required, stretching the resulting laminate separately or simultaneously in the machine direction and/or the transverse direction.

(2) A method which comprises extruding the crystalline random propylene copolymer composition in the molten state onto the surface of a non-stretched, monoaxially stretched or biaxially stretched substrate and when the substrate is non-stretched, optionally stretching the resulting laminate monoaxially or biaxially. When the substrate is monoaxially stretched, the resulting laminate may, if required, be further stretched in the same direction as the stretching of the substrate or in a direction crossing that direction.

(3) A method which comprises laminating a film of the crystalline random propylene copolymer composition to the surface of a substrate of crystalline polypropylene by using an adhesive. Examples of the adhesive used are emulsions of polyvinylidene chloride, polyacrylic acid esters and chlorinated polypropylene. After applying the adhesive to the substrate, the film of the composition is laminated.

The polypropylene composite laminate so prepared may be in any shape, for example a laminated film, a laminated sheet, a laminated packaging bag, a laminated container or another molded article having heat-sealability.

As is clear from the above exemplified methods of lamination, the substrate layer of crystalline polypropylene constituting the propylene composite laminate may be in the non-stretched state or in the monoaxially or biaxially stretched state. The layer of the crystalline random propylene copolymer composition may likewise be non-stretched or monoaxially or biaxially stretched. The substrate layers in the above states and the copolymer composition layers in the above states may be used in any desired combinations.

The thickness of the substrate layer of crystalline polypropylene is not particularly restricted. But the heat sealed layer of the crystalline random propylene copolymer composition has a thickness of generally 0.1 to 50 microns, preferably 0.5 to 30 microns. When the polypropylene composite laminate is a composite laminated film or a composite laminated sheet, the thickness of the substrate layer of crystalline polypropylene is 5 to 200 microns, preferably 10 to 70 microns, and the heat-sealed layer composed of the crystalline random propylene copolymer composition is usually 0.1 to 50 microns, preferably 0.5 to 30 microns.

The polypropylene composite laminate formed by laminating a layer of the crystalline random propylene copolymer composition of this invention to one or both surfaces of a substrate of crystalline polypropylene has excellent low-temperature heat sealability and heat seal strength with a broadened range of temperatures at which it can be heat sealed. In addition, it has superior scratch resistance and antiblocking property. By taking advantage of these properties, the laminate finds suitable applications in packaging of daily goods and sundries such as food packaging and apparel packaing.

The following examples illustrate the present invention specifically. In these examples, the various items shown below were tested by the following methods.

(1) Heat seal strength

That surface of a composite polypropylene film on which the crystalline random propylene copolymer composition is laminated is contacted with itself, and the contacting portion is heat-sealed by means of a seal bar having a width of 5 mm for 1 second under a pressure of 2 kg/cm$^2$ at a given temperature and then allowed to cool spontaneously. A test sample, 15 mm width, is cut out from the heat-sealed product, and the strength at which the heat-sealed portion is peeled apart at a crosshead speed of 200 mm/min. is determined and defined as the heat seal strength.

Separately, the above composite polypropylene film is left to stand for 1 week in an air atmosphere at 50° C., and then the strength of the heat-sealed portion is measured by the same method as above and defined as the heat seal strength after heat-treatment.

(2) Scratch resistance

That surface of a composite polypropylene film on which the crystalline random propylene copolymer is laminated is contacted with itself, and the contacting surface portions are rubbed with each other 15 times using an iron block weighing 5 kg as a load. Then, the degree of haze of the sample is measured by the method of (4) described below, and the difference (Δ degree of haze) of the measured degree of haze from the degree of haze of the sample before rubbing is determined.

(3) Antiblocking property

Determined in accordance with ASTM D1893. A sample, 10 cm wide and 15 cm long, is cut out from a composite polypropylene film. That surface of the sample on which the crystalline random propylene copolymer composition is laminated is contacted with itself. The contacting portion is held by two glass sheets. A load of 10 kg is placed on it, and the sample is left to stand in an air oven at 50° C. The sample is taken out 1 day and 7 days later, and its peel strength is measured by a universal tester. The peel strength value per cm is defined as a blocking value.

(4) Degree of haze (ASTM D1003)

A film formed is aged in an air oven at 50° C. The degree of haze of the film is measured before the aging and 1 day and 7 days after the aging.

(5) Slipping property (ASTM D1894)

A film prepared is aged in an air oven at 50° C. The coefficient of static friction and the coefficient of dynamic friction of the film are measured before the aging and 1 day and 7 days after the aging.

The production of the 1-butene random copolymers used in the following Examples and Comparative Examples is shown in Referential Examples 1 to 11, and the properties of the resulting copolymers are summarized in Table 1.

Table 2 summarizes the properties of crystalline polypropylene used as a substrate layer and the crystalline random propylene copolymer (i) incorporated in the crystalline random copolymer composition. These propylene polymers were used in the following Examples and Comparative Examples.

REFERENTIAL EXAMPLE 1

Preparation of a titanium catalyst component (a)

Anhydrous magnesium chloride (4.76 g; 50 mmoles), 25 ml of decane and 23.4 ml (150 mmoles) of 2-ethylhexyl alcohol were reacted at 130° C. for 2 hours to form a uniform solution. Phthalic anhydride (1.11 g; 7.5 mmoles) was added to the solution, and the mixture was stirred for 1 hour at 130° C. to dissolve phthalic anhydride uniformly in the solution. The resulting uniform solution was cooled to room temperature, and 200 ml (1.8 moles) of titanium tetrachloride kept at −20° C. was added dropwise over 1 hour. After the addition, the temperature of the mixture was raised to 110° C. over 4 hours. When its temperature reached 110° C., 2.68 ml (12.5 mmoles) of diisobutyl phthalate was added, and the mixture was maintained at this temperature for 2 hours with stirring. After the 2-hour reaction, the solid portion was collected by hot filtration, and suspended in 200 ml of TiCl$_4$. Again, the suspension was reacted at 110° C. for 2 hours. After the reaction, the solid portion was collected by hot filtration, and washed thoroughly with decane and hexane at 110° C. until no free titanium compound was detected from the washings. The titanium catalyst component (a) so prepared was stored as a hexane slurry. A part of it was dried to examine the composition of the catalyst component. The resulting titanium catalyst component (a) contained 3.1% by weight of titanium, 56.0% by weight of chlorine, 17.0% by weight of magnesium and 20.9% by weight of diisobutyl phthalate.

Polymerization

A 200-liter SUS reaction vessel was continuously charged hourly with 69 liters of liquid 1-butene, 31 liters of 4-methyl-1-pentene (4MP for short), 100 mmoles of triethyl aluminum, 10 mmoles of vinyltriethoxy-silane and 0.5 mmole, as titanium atom, of the titanium catalyst component (a). The partial hydrogen pressure in the vapor phase was maintained at 1.5 kg/cm$^2$, and the polymerization temperature, at 70° C.

The polymer solution was continuously withdrawn so that the amount of the solution in the reaction vessel became 100 liters. A small amount of methanol was added to stop the polymerization, and the unreacted monomers were removed. A butene-1 copolymer was obtained in an amount of 8.5 kg per hour. The results are shown in Table 1.

REFERENTIAL EXAMPLES 2-4

Referential Example 1 was repeated except that the amounts of 1-butene and 4MP charged and the partial hydrogen pressure were changed as indicated in Table 1.

REFERENTIAL EXAMPLE 5

Referential Example 1 was repeated except that 84 liters of 1-butene and 16 liters of 1-hexene were used hourly in the polymerization. The results are shown in Table 1.

REFERENTIAL EXAMPLE 6

Referential Example 1 was repeated except that 84 liters of 1-butene and 16 liters of 1-octene were used hourly in the polymerization. The results are shown in Table 1.

REFERENTIAL EXAMPLES 7-8

Referential Example 1 was repeated except that the amounts of 1-butene and 4MP charged and the partial pressure of hydrogen were changed as indicated in Table 1. The results are shown in Table 1.

REFERENTIAL EXAMPLE 9

A 200-liter reaction vessel was continuously charged hourly with 75 liters of liquid 1-butene, 25 liters of 4MP, 200 mmoles of diethyl aluminum chloride, and 100 mmoles of titanium trichloride (TAC-131, a product of Toho Titanium Co., Ltd.). The partial hydrogen pressure in the vapor phase was maintained at 2.5 kg/cm$^2$, and the polymerization temperature, at 70° C. The polymerization solution was continuously withdrawn from the reaction vessel so that the amount of the solution residing in the vessel became 100 liters. Methanol was added in an amount of 10 liters per hour. The polymer solution was then washed with water to remove the unreacted monomers. A butene-1/4MP copolymer was obtained in an amount of 6.8 kg per hour. The results are shown in Table 1.

REFEENTIAL EXAMPLES 10-11

Referential Example 9 was repeated except that each of the comonomers indicated in Table 1 was used, 1butene and the comonomer were charged in the amounts indicated in Table 1, and the partial pressure of hydrogen was changed as indicated in Table 1. The results are shown in Table 1.

EXAMPLES 1-9 AND COMPARATIVE EXAMPLES 1-9

Pellets of the crystalline random propylene copolymer (i) and pellets of the 1-butene random copolymer (ii) shown in Table 3 in the proportions indicated were mixed by a Henschel mixer for 1 minute. The mixture was kneaded in the molten state in a melt-extruder to form a melt of a crystalline random propylene copolymer composition. The composition was fed into a die for a two-layer film while maintaining the temperature of the resin at 240° C. Separately, the crystalline polypropylene as a substrate layer shown in Table 3 was melted in another extruder, and fed into the aforesaid two-layer film die while maintaining the temperature of the resin at 240° C. The crystalline random propylene copolymer composition and the crystalline polypropylene were co-extruded from the die to form a composite film composed of a substrate layer (40 microns) of the crystalline polypropylene and a layer (10 microns) of the crystalline random propylene copolymer composition. The properties of the composite polypropylene film were evaluated, and the results are shown in Table 3.

TABLE 1

| Referential Example | | Proportions of the monomers | | | Alpha-olefin content (mole %) | Intrinsic viscosity [η] (dl/g) | DSC melting point [Tm] (°C.) | Crystallinity (%) | [W$_1$] | | | [W$_2$] |
|---|---|---|---|---|---|---|---|---|---|---|---|---|
| | | 1-Butene (l/hr) | Alpha-olefin | (l/hr) | | | | | (wt %) | 0.02a +1.0 (wt %) | (wt %) | 5 × [η]$^{-1.2}$ |
| 1 | BC-1 | 69 | 4MP | 31 | 3.8 | 1.8 | 103 | 46.2 | 0.3 | 1.1 | 0.6 | 2.5 |
| 2 | BC-2 | 54 | 4MP | 46 | 7.9 | 2.3 | 96 | 35.8 | 0.3 | 1.2 | 0.5 | 1.8 |
| 3 | BC-3 | 43 | 4MP | 57 | 12.3 | 2.1 | 92 | 32.5 | 0.4 | 1.2 | 0.6 | 2.1 |
| 4 | BC-4 | 30 | 4MP | 70 | 22.9 | 2.5 | 80 | 26.4 | 0.4 | 1.5 | 0.7 | 1.7 |
| 5 | BC-5 | 84 | 1-hexene | 16 | 10.8 | 2.3 | 93 | 33.6 | 0.4 | 1.2 | 0.6 | 1.8 |
| 6 | BC-6 | 84 | 1-octene | 16 | 9.6 | 2.3 | 94 | 30.4 | 0.3 | 1.2 | 0.6 | 1.8 |
| 7 | BC-1* | 95 | 4MP | 5 | 0.4 | 2.9 | 123 | 55.1 | 0.2 | 1.0 | 0.3 | 1.4 |
| 8 | BC-2* | 10 | 4MP | 90 | 62.6 | 2.3 | 25 | 3.6 | 1.1 | 2.3 | 1.6 | 1.8 |
| 9 | BC-3* | 75 | 4MP | 25 | 7.1 | 1.9 | 98 | 26.3 | 2.4 | 1.2 | 3.4 | 2.3 |
| 10 | BC-4* | 67 | 4MP | 33 | 11.6 | 2.0 | 94 | 23.4 | 2.7 | 1.2 | 3.1 | 2.2 |
| 11 | BC-5* | 84 | 1-hexene | 16 | 12.0 | 2.1 | 94 | 20.7 | 2.6 | 1.2 | 3.0 | 2.1 |

| | Referential Example | | Stress at yield point (kg/cm$^2$) | Stress at break point (kg/cm$^2$) | Elongation at break (%) | Torsional rigidity (kg/cm$^2$) | Young's modulus (kg/cm$^2$) | Standard deviation (mole %) |
|---|---|---|---|---|---|---|---|---|
| | 1 | BC-1 | 57 | 430 | 650 | 600 | 1300 | 0.4 |
| | 2 | BC-2 | 48 | 330 | 800 | 550 | 1200 | 1.5 |
| | 3 | BC-3 | 45 | 250 | 1000 | 500 | 1100 | 2.5 |
| | 4 | BC-4 | 47 | 210 | 900 | 400 | 900 | 4.5 |
| | 5 | BC-5 | 47 | 280 | 1100 | 550 | 1150 | 2.2 |
| | 6 | BC-6 | 49 | 300 | 800 | 550 | 1150 | 1.9 |
| | 7 | BC-1* | 132 | 530 | 380 | 1400 | 2400 | 0.1 |
| | 8 | BC-2* | 16 | 70 | 1200 | 120 | 250 | 10.4 |
| | 9 | BC-3* | 38 | 180 | 800 | 340 | 750 | 3.4 |
| | 10 | BC-4* | 26 | 150 | 900 | 310 | 650 | 5.6 |
| | 11 | BC-5* | 25 | 140 | 950 | 280 | 600 | 6.1 |

*Outside the scope of the 1-butene random copolymer of this invention

TABLE 2

| | Comonomer | | Intrinsic viscosity [η] (dl/g) | DSC melting point (°C.) | Crystallinity (%) |
|---|---|---|---|---|---|
| | Type | Content (mole %) | | | |
| PP-1 | — | 0 | 3.2 | 163 | 65 |
| PP-2 | — | 0 | 2.3 | 165 | 67 |
| PP-3 | — | 0 | 3.3 | 163 | 64 |
| PEC-1 | ethylene | 6.4 | 2.3 | 134 | 52 |
| PEB-1 | ethylene | 3.1 | 2.5 | 130 | 49 |
| | 1-butene | 2.5 | | | |

EXAMPLES 10-12 AND COMPARATIVE EXAMPLE 10

Each of the crystalline polypropylene substrates shown in Tables 2 and 3 was melted in an extruder, extruded from a T-die at a resin temperature of 270° C., and cooled and solidified into a sheet form. The extrudate was then passed through hot rolls to stretch it in the machine direction at a stretch ratio of 5 and thus form a monoaxially stretched sheet of crystalline polypropylene.

Each of the crystalline random propylene copolymer compositions shown in Table 3 was melt-kneaded in another extruder, and extruded from another T-die at a resin temperature of 250° C. onto one surface of the resulting monoaxially stretched sheet of crystalline polypropylene. The resulting composite sheet was continuously passed through a heated tenter to stretch it in the transverse direction at a stretch ratio of 10. As a result, a composite polypropylene film was obtained which was composed of a biaxially stretched substrate layer (30 microns) of crystalline polypropylene and a monoaxially stretched layer (5 microns) of the crystalline random propylene copolymer composition. The properties of the resulting composite polypropylene film were evaluated, and the results are shown in Table 3.

What is claimed is:

1. A crystalline random propylene copolymer composition comprising (i) a crystalline random propylene copolymer comprising 99 to 85 mole % of propylene and 1 to 15 mole % of an alpha-olefin other than propylene and (ii) a random 1-butene copolymer comprising 1-butene and an alpha-olefin having at least 5 carbon atoms, the weight ratio of the copolymer (i) to the copolymer (ii) being in the range of from 5:95 to 90:10, said random 1-butene copolymer (ii) satisfying the following conditions:

(A) it comprises 50 to 99 mle % of the 1-butene component and 1 to 50 mole % of the alpha-olefin,

TABLE 3

| Example (Ex.) or Comparative Example (CEx.) | Crystalline random propylene copolymer composition | | | Properties of the composite polypropylene laminate | | | | | | | | | | | |
|---|---|---|---|---|---|---|---|---|---|---|---|---|---|---|---|
| | Crystalline random propylene copolymer (i) | Random 1-butene copolymer (ii) | Weight ratio (i)/(ii) | Substrate polypropylene | Haze (%) | | | Slip coefficient (coefficient of static friction/ coefficient of dynamic friction) | | | | | | Antiblocking property (g/cm) | | Scratch resistance (%) |
| | | | | | Before | After 1 day | After 7 days | Before | | After 1 day | | After 7 days | | After 1 day | After 7 days | |
| Ex. 1 | PEC-1 | BC-1 | 50/50 | PP-1 | 2.0 | 2.4 | 2.7 | 0.40 | 0.37 | 0.35 | 0.33 | 0.39 | 0.35 | 2.2 | 2.8 | 3.1 |
| Ex. 2 | " | BC-2 | " | " | 1.8 | 2.1 | 2.6 | 0.40 | 0.38 | 0.36 | 0.33 | 0.40 | 0.37 | 2.2 | 2.9 | 3.8 |
| Ex. 3 | " | BC-2 | 30/70 | " | 1.8 | 2.3 | 2.8 | 0.44 | 0.39 | 0.39 | 0.35 | 0.45 | 0.40 | 3.1 | 4.5 | 4.3 |
| Ex. 4 | " | BC-3 | 50/50 | " | 1.7 | 2.1 | 2.6 | 0.43 | 0.38 | 0.39 | 0.34 | 0.45 | 0.40 | 2.6 | 3.4 | 4.1 |
| Ex. 5 | " | BC-4 | " | " | 1.8 | 2.3 | 2.7 | 0.45 | 0.40 | 0.39 | 0.35 | 0.48 | 0.43 | 3.9 | 4.8 | 4.6 |
| Ex. 6 | " | BC-5 | " | " | 1.8 | 2.2 | 2.7 | 0.42 | 0.38 | 0.38 | 0.35 | 0.42 | 0.38 | 2.7 | 3.3 | 4.0 |
| Ex. 7 | " | BC-6 | " | " | 1.7 | 2.2 | 2.8 | 0.43 | 0.38 | 0.38 | 0.35 | 0.42 | 0.38 | 2.6 | 3.5 | 4.3 |
| Ex. 8 | PEB-1 | BC-2 | " | " | 1.6 | 2.0 | 2.5 | 0.40 | 0.38 | 0.35 | 0.33 | 0.39 | 0.36 | 2.3 | 2.8 | 3.7 |
| Ex. 9 | " | " | 30/70 | " | 1.6 | 2.1 | 2.6 | 0.45 | 0.39 | 0.39 | 0.35 | 0.47 | 0.44 | 3.4 | 4.4 | 4.5 |
| Ex. 10 | PEC-1 | " | 50/50 | PP-3 | 1.6 | 1.9 | 2.4 | 0.39 | 0.37 | 0.34 | 0.32 | 0.41 | 0.38 | 2.0 | 2.7 | 3.9 |
| Ex. 11 | " | " | 30/70 | " | 1.5 | 1.9 | 2.5 | 0.43 | 0.40 | 0.40 | 0.36 | 0.45 | 0.39 | 3.1 | 4.0 | 4.7 |
| Ex. 12 | PEB-1 | " | 50/50 | " | 1.5 | 1.8 | 2.3 | 0.39 | 0.36 | 0.35 | 0.33 | 0.40 | 0.38 | 2.3 | 3.0 | 4.0 |
| CEx. 1 | PEC-1 | — | 100/00 | PP-1 | 1.3 | 1.4 | 1.5 | 0.34 | 0.31 | 0.29 | 0.26 | 0.32 | 0.28 | 0.5 | 0.8 | 2.0 |
| CEx. 2 | — | BC-2 | 0/100 | " | 1.5 | 3.0 | 4.5 | 0.60 | 0.47 | 0.93 | 0.80 | | | 7.3 | 11.8 | 8.0 |
| CEx. 3 | PEC-1 | BC-1* | 50/50 | " | 4.5 | 4.8 | 5.0 | 0.40 | 0.36 | 0.36 | 0.34 | 0.41 | 0.37 | 0.9 | 1.2 | 2.4 |
| CEx. 4 | " | BC-2* | " | " | 2.4 | 4.3 | 6.6 | 0.58 | 0.47 | 0.90 | 0.78 | —* | —* | 7.6 | 13.1 | 7.1 |
| CEx. 5 | " | BC-3* | " | " | 2.5 | 5.1 | 7.8 | 0.52 | 0.44 | 0.91 | 0.79 | —* | —* | 7.1 | 12.0 | 4.5 |
| CEx. 6 | " | BC-4* | " | " | 2.2 | 6.0 | 9.3 | 0.55 | 0.47 | 0.95 | 0.83 | —* | —* | 8.2 | 17.1 | 5.8 |
| CEx. 7 | " | BC-5* | " | " | 2.3 | 5.8 | 9.0 | 0.53 | 0.46 | 0.95 | 0.82 | —* | —* | 7.3 | 17.5 | 6.1 |
| CEx. 8 | PP-2 | BC-2 | " | " | 2.0 | 2.4 | 2.7 | 0.37 | 0.34 | 0.32 | 0.30 | 0.36 | 0.34 | 2.1 | 2.8 | 3.0 |
| CEx. 9 | " | " | 30/70 | " | 1.7 | 2.0 | 2.5 | 0.43 | 0.38 | 0.38 | 0.35 | 0.46 | 0.40 | 2.7 | 3.7 | 3.7 |
| CEx. 10 | PEC-1 | BC-3* | 50/50 | PP-3 | 1.8 | 4.2 | 6.3 | 0.50 | 0.46 | 0.80 | 0.72 | — | — | 6.2 | 11.3 | 5.0 |

| Example (Ex.) or Comparative Example (CEx.) | Properties of the composite polypropylene laminate | | | | | | | | | | | | | |
|---|---|---|---|---|---|---|---|---|---|---|---|---|---|---|
| | Heat seal strength (g/15 mm) | | | | | | | Heat seal strength after heat treatment (g/15 mm) | | | | | | |
| | 70° C. | 80° C. | 90° C. | 100° C. | 110° C. | 120° C. | 130° C. | 80° C. | 90° C. | 100° C. | 110° C. | 120° C. | 130° C. | 140° C. |
| Ex. 1 | 100 | 340 | 1130 | 1560 | 1530 | 1600 | 1620 | 200 | 560 | 1200 | 1580 | 1590 | 1650 | 1650 |
| Ex. 2 | 300 | 790 | 1530 | 1580 | 1580 | 1620 | 1650 | 350 | 730 | 1580 | 1550 | 1600 | 1600 | 1650 |
| Ex. 3 | 720 | 1200 | 1550 | 1580 | 1550 | 1600 | 1600 | 410 | 750 | 1500 | 1580 | 1590 | 1580 | 1600 |
| Ex. 4 | 680 | 1160 | 1520 | 1590 | 1550 | 1570 | 1650 | 440 | 830 | 1550 | 1550 | 1600 | 1600 | 1620 |
| Ex. 5 | 920 | 1270 | 1480 | 1550 | 1520 | 1580 | 1600 | 860 | 1100 | 1390 | 1550 | 1560 | 1590 | 1630 |
| Ex. 6 | 530 | 1020 | 1520 | 1570 | 1590 | 1620 | 1650 | 310 | 720 | 1570 | 1550 | 1600 | 1620 | 1650 |
| Ex. 7 | 390 | 1030 | 1550 | 1530 | 1550 | 1590 | 1650 | 290 | 780 | 1550 | 1550 | 1620 | 1620 | 1650 |
| Ex. 8 | 280 | 800 | 1580 | 1570 | 1600 | 1550 | 1620 | 330 | 750 | 1550 | 1530 | 1580 | 1620 | 1650 |
| Ex. 9 | 750 | 1190 | 1550 | 1550 | 1550 | 1580 | 1620 | 500 | 800 | 1520 | 1550 | 1570 | 1590 | 1650 |
| Ex. 10 | 260 | 420 | 530 | 510 | 550 | 560 | 560 | 350 | 530 | 550 | 520 | 550 | 550 | 560 |
| Ex. 11 | 320 | 470 | 530 | 530 | 550 | 540 | 560 | 450 | 520 | 530 | 530 | 550 | 550 | 550 |
| Ex. 12 | 270 | 410 | 550 | 550 | 530 | 560 | 560 | 350 | 530 | 540 | 550 | 550 | 560 | 560 |
| CEx. 1 | — | — | — | — | — | 80 | 310 | — | — | — | — | — | 150 | 750 |
| CEx. 2 | 793 | 1100 | 1380 | 1360 | 1380 | 1350 | 1350 | 370 | 580 | 900 | 1120 | 1380 | 1340 | 1350 |
| CEx. 3 | — | — | — | 80 | 270 | 950 | 1690 | — | — | — | 100 | 490 | 1120 | 1650 |
| CEx. 4 | 120 | 300 | 530 | 820 | 1300 | 1450 | 1480 | 120 | 250 | 390 | 720 | 970 | 1190 | 1480 |
| CEx. 5 | 270 | 650 | 1480 | 1550 | 1560 | 1600 | 1600 | — | 80 | 350 | 670 | 1000 | 1380 | 1650 |
| CEx. 6 | 300 | 920 | 1450 | 1530 | 1560 | 1590 | 1620 | — | 120 | 500 | 680 | 890 | 1050 | 1630 |
| CEx. 7 | 310 | 880 | 1430 | 1520 | 1550 | 1550 | 1600 | — | 150 | 480 | 700 | 850 | 1160 | 1600 |
| CEx. 8 | — | 80 | 230 | 620 | 830 | 970 | 1200 | — | 60 | 130 | 580 | 790 | 900 | 1160 |
| CEx. 9 | 80 | 200 | 530 | 600 | 820 | 1100 | 1260 | 90 | 150 | 320 | 610 | 900 | 1030 | 1200 |
| CEx. 10 | 250 | 420 | 530 | 550 | 550 | 530 | 550 | — | 50 | 120 | 210 | 390 | 530 | 550 |

Note:
"—*" means that the measurement was impossible.

(B) it has an intrinsic viscosity $[\eta]$, measured in decalin at 135° C., of from 0.5 to 6 dl/g, (C) it has a melting point [Tm], measured by a differential scanning calorimeter, of from 30° to 120° C., (D) it has a crystallinity, measured by X-ray diffractometry, of from 5 to 60%, (E) the amount [$W_1$ in % by weight] of that portion of it which is soluble in boiling methyl acetate is not more than 2%, and (F) the amount [$W_2$ in % by weight] of that portion of it which is soluble in a 1:1 by volume mixture of acetone and n-decane at 10° C. is less than $5 \times [\eta]^{-1.2}$.

2. The composition of claim 1 wherein the 1-butene copolymer further has a stress at yield point (G), measured in accordance with JIS K-7113, of 10 to 200 kg/cm$^2$.

3. The composition of claim 1 wherein the 1-butene copolymer further has a stress at break point (H), measured in accordance with JIS K-7113, of 10 to 1000 kg/cm$^2$.

4. The composition of claim 1 wherein the 1-butene copolymer further has an elongation at break point (I), measured in accordance with JIS K-7113, of at least 300%.

5. The composition of claim 1 wherein the 1-butene copolymer further has a torsional rigidity (J), measured in accordance with JIS K-6745, of 100 to 2000 kg/cm$^2$.

6. The composition of claim 1 wherein the 1-butene copolymer has a Young's modulus (K), measured in accordance with JIS K-7113, of 200 to 4000 kg/cm$^2$.

7. The composition of claim 1 wherein the standard deviation (L) of the 1-butene content of the 1-butene copolymer is not more than 0.4a mole in which a represents the ethylene content of said copolymer.

8. The composition of claim 1 wherein the alpha-olefin in the 1-butene copolymer has 5 to 20 carbon atoms.

9. The composition of claim 1 wherein the 1-butene copolymer is composed of 60 to 98 mole % of the 1-butene component and 2 to 40 mole % of the alpha-olefin component.

10. The composition of claim 8 wherein the alpha-olefin is selected from the group consisting of 1-pentene, 1-hexene, 4-methyl-1-pentene, 3-methyl-1-pentene, 1-octene, 1-decene, 1-dodecene, 1-tetradecene, 1-hexadecene, 1-octadecene and 1-eicosene.

11. The composition of claim 1 wherein the weight ratio of the crystalline random propylene copolymer (i) to the 1-butene-type random copolymer (ii) is in the range of from 10:90 to 85:15.

12. A polypropylene composite laminate comprising a layer of the crystalline random propylene copolymer composition of claim 1 and a substrate layer of crystalline polypropylene laminated to at least one surface of said layer.

13. The laminate of claim 12 wherein the substrate layer of crystalline polypropylene is in the non-stretched state or in the monoaxially or biaxially stretched state.

14. The laminate of claim 12 wherein the layer of the crystalline random propylene copolymer is in the non-stretched state or in the monoaxially or biaxially stretched state.

15. The laminate of claim 12 wherein the layer of the crystalline random propylene copolymer composition has a thickness of 0.1 to 50 microns.

16. The laminate of claim 12 wherein the crystalline polypropylene constituting the substrate layer is selected from a crystalline homopolymer of propylene and crystalline propylene/alpha-olefin random copolymers.

17. The composition of claim 1 wherein the amount of that portion of the 1-butene-type copolymer (ii) which is soluble in a mixture of acetone and n-decane at 10° C. [(condition (F)] is $0.1 \times [\eta]^{-1.2}$ to $5 \times [\eta]^{-1.2}$% by weight.

18. The composition of claim 1 wherein the amount of that portion of the 1-butene-type copolymer (ii) which is soluble in a mixture of acetone and n-decane at 10° C. [(condition (F)] is $0.2 \times [\eta]^{-1.2}$ to $4 \times [\eta]^{-1.2}$% by weight.

19. The composition of claim 1 wherein the amount of that portion of the 1-butene-type copolymer (ii) which is soluble in a mixture of acetone and n-decane at 10° C. [(condition (F)] is $0.3 \times [\eta]^{-1.2}$ to $4 \times [\eta]^{-1.2}$% by weight.

20. The laminate of claim 12 wherein the amount of that portion of the 1-butene-type copolymer (ii) which is soluble in a mixture of acetone and n-decane at 10° C. [(condition (F)] is $0.1 \times [\eta]^{-1.2}$ to $5 \times [\eta]^{-1.2}$% by weight.

21. The laminate of claim 11 wherein the amount of that portion of the 1-butene-type copolymer (ii) which is soluble in a mixture of acetone and n-decane at 10° C. [(condition (F)] is $0.2 \times [\eta]^{-1.2}$ to $4 \times [\eta]^{-1.2}$% by weight.

22. The laminate of claim 12 wherein the amount of that portion of the 1-butene-type copolymer (ii) which is soluble in a mixture of acetone and n-decane at 10° C. [(condition (F)] is $0.3 \times \eta]^{-1.2}$ to $4 \times [\eta]^{-1.2}$% by weight.

* * * * *